United States Patent
Jung

(10) Patent No.: US 8,410,450 B2
(45) Date of Patent: Apr. 2, 2013

(54) APPARATUS FOR DETECTING X-RAYS AND METHOD OF OPERATING THE SAME

(75) Inventor: Kwan-Wook Jung, Yongin (KR)

(73) Assignee: Samsung Display Co., Ltd., Giheung-Gu, Yongin, Gyeonggi-Do (KR)

(*) Notice: Subject to any disclaimer, the term of this patent is extended or adjusted under 35 U.S.C. 154(b) by 243 days.

(21) Appl. No.: 12/973,432

(22) Filed: Dec. 20, 2010

(65) Prior Publication Data

US 2011/0163241 A1 Jul. 7, 2011

(30) Foreign Application Priority Data

Jan. 4, 2010 (KR) .............................. 2010-0000208

(51) Int. Cl.
*G01T 1/00* (2006.01)

(52) U.S. Cl. ...................................... 250/371; 378/98.8

(58) Field of Classification Search ................ 250/336.1, 250/370.08, 370.09, 371; 378/98.8
See application file for complete search history.

(56) References Cited

U.S. PATENT DOCUMENTS 6,469,740 B1    10/2002  Kuroda et al.
2009/0245465 A1  10/2009 Jung et al.

FOREIGN PATENT DOCUMENTS

| JP | 2001-309236 A | 11/2001 |
|---|---|---|
| JP | 2003000578 | 1/2003 |
| JP | 2009100848 A | 5/2009 |
| JP | 2009201586 A | 9/2009 |
| JP | 2009279201 | 12/2009 |
| KR | 1998-071065 A | 10/1998 |
| KR | 1020000024969 A | 5/2000 |
| KR | 10-2004-0010299 A | 1/2004 |
| KR | 1020080073560 A | 8/2008 |
| KR | 1020090028884 A | 3/2009 |
| KR | 1020090087278 A | 8/2009 |

*Primary Examiner* — Mark R Gaworecki
(74) *Attorney, Agent, or Firm* — Robert E. Bushnell, Esq.

(57) ABSTRACT

An apparatus for detecting X-rays and a driving method of the X-ray detecting apparatus. The driving method includes sampling a first data voltage corresponding to a rheobase voltage and a bias voltage, the rheobase voltage being generated by a current from a photodiode, sampling a second data voltage corresponding to the bias voltage after resetting the rheobase voltage, and resetting the rheobase voltage from the time that the sampling of the second data voltage is finished to the time that a corresponding frame is finished. An image delay generated when an X-ray motion picture is displayed may be minimized.

11 Claims, 3 Drawing Sheets

APPARATUS FOR DETECTING X-RAYS AND METHOD OF OPERATING THE SAME

CLAIM OF PRIORITY

This application makes reference to, incorporates into this specification the entire contents of, and claims all benefits accruing under 35 U.S.C. §119 from an application earlier filed in the Korean Intellectual Property Office on Jan. 4, 2010, and there duly assigned Serial No. 10-2010-0000208.

BACKGROUND OF THE INVENTION

1. Field of the Invention

The present invention relates to an apparatus for detecting X-rays and a driving method thereof. More particularly, the present invention relates to an apparatus for detecting X-rays and a driving method thereof to minimize a delay of images generated when detecting X-rays.

2. Description of the Related Art

An apparatus for detecting X-rays detects an X-ray image of a subject generated by an X-ray generator and provides the X-ray image to a display device. Recently, an X-ray detecting apparatus of a flat panel type using a digital radiography method without a film has been widely applied.

The above information disclosed in this Background section is only for enhancement of understanding of the background of the invention and therefore it may contain information that does not form the prior art that is already known in this country to a person of ordinary skill in the art.

SUMMARY OF THE INVENTION

One aspect of this disclosure provides an improved X-ray detecting apparatus and an improved driving method for driving the X-ray detecting apparatus.

Another aspect of this disclosure provides an X-ray detecting apparatus and a driving method thereof to minimize the image delay.

According to one aspect of this disclosure, a driving method of an X-ray detecting apparatus includes sampling a first data voltage corresponding to a rheobase voltage and a bias voltage, the rheobase voltage being generated by a current from a photodiode, sampling a second data voltage corresponding to the bias voltage after resetting the rheobase voltage, and resetting the rheobase voltage from the time that the sampling of the second data voltage is finished to the time that a corresponding frame is finished.

The sampling of the first data voltage may include applying a scan signal to turn on a switching transistor, the switching transistor switching a current corresponding to the rheobase voltage to generate the first data voltage, and applying the first data voltage to a data detector through the turned-on switching transistor.

The sampling of the second data voltage may include applying a reset signal to a reset transistor resetting the rheobase voltage, applying the scan signal to turn on the switching transistor and to generate the second data voltage, and applying the second data voltage to the data detector through the turned-on switching transistor.

The method may further contemplate removing electrical noise by obtaining a difference between the first data voltage and the second data voltage.

According to another aspect of this disclosure, an X-ray detecting apparatus may be constructed with an X-ray receiving panel including a photo-detecting pixel, a data detector detecting a data signal from which noise is removed from a signal output from the X-ray receiving panel through noise sampling, and a reset driver applying a reset signal to the photo-detecting pixel. The reset signal resets a rheobase voltage generated by the photo-detecting pixel for the noise sampling. The reset driver applies the reset signal after detecting the data signal from which the noise is removed in the data detector until the time that a corresponding frame is finished.

The photo-detecting pixel may include a photodiode generating a first current corresponding to visible rays incident through a scintillator layer, a capacitor being charged by the first current generated in the photodiode, a driving transistor passing a second current corresponding to a voltage charged to the capacitor, a switching transistor switching the second current flowing in through the driving transistor, and a reset transistor resetting the voltage charged to the capacitor.

The photodiode may be a hydrogenated amorphous silicon PIN diode. The switching transistor may be a low temperature polysilicon TFT. The reset transistor may be a low temperature polysilicon TFT.

The X-ray detecting apparatus may further include a scan driver applying a scan signal to a scan line connected to a gate electrode of the switching transistor. The scan signal turns on or off the switching transistor.

The X-ray detecting apparatus may further include a signal controller generating a reset driving signal controlling the operation of the reset driver, and generating a scan driving signal controlling the operation of the scan driver.

An image delay generated when a X-ray motion picture is displayed may be minimized.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
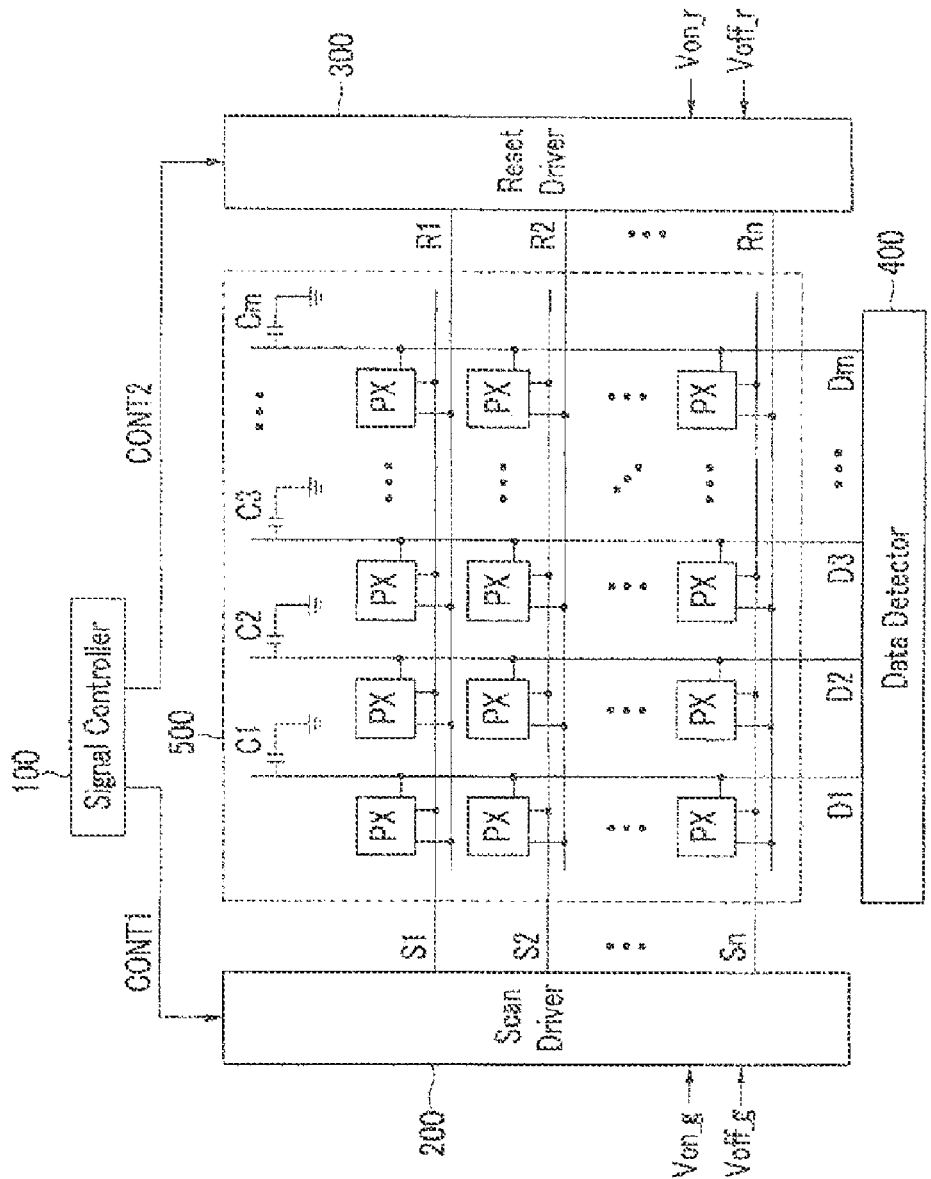
FIG. 1 is a block diagram of an X-ray detecting apparatus constructed as an exemplary embodiment according to the principles of the present invention.

An X-ray detecting apparatus of a flat panel type includes a plurality of light detecting pixels to detect X-rays in a flat panel. Each light detecting pixel detects the X-rays generated by the X-ray generator and passed through a subject and outputs the X-rays as an electrical signal. The electrical signal is read out in a row unit from the flat panel by readout integrated circuits (ROTC). The signal output from the readout integrated circuit is converted into a video signal through a signal processing process and is transmitted to a display device to display the X-ray image.

An initial model of the X-ray detecting apparatus has a target for displaying a still image. In the case of the still image, electrical noise is very small compared with quantum noise such that detective quantum efficiency (DQE) is not largely influenced even though an amorphous silicon thin film transistor (a-Si TFT) is used for detecting the X-ray still image.

Recently, the X-ray detecting apparatus has a target for displaying a motion picture as well as the still image. To reduce the amount of display of the X-ray motion picture and the irradiation of the X-rays, the X-ray detecting apparatus detects the X-rays irradiated at a 1/300 level compared with the case of displaying the still image. If the irradiation amount of the X-rays is decreased, the influence of the electrical noise is large compared with the quantum noise such that the detective quantum efficiency (DQE) is decreased. Accordingly, the electrical noise must be minimized to improve the detective quantum efficiency.

If a photo-detecting pixel is amplified by using a low temperature poly-Si (LTPS) TFT, the electrical noise may be effectively reduced. When the LTPS TFT is applied to the X-ray detecting apparatus of the flat panel, a hydrogenated amorphous silicon (a-Si:H) PIN diode is used as a diode for the X-ray detecting. A PIN diode is a semiconductor device formed with a P-region, an intrinsic region (I-region), and a N-region. When the LTPS TFT is applied to the X-ray detecting apparatus of the flat panel, an image delay may undesirably occur because the image of a previous frame is not exhausted during a short time. A frame period is a period for displaying an X-ray image on a screen.

Hereinafter, exemplary embodiments of the present invention will be described in detail with reference to the accompanying drawings such that those skilled in the art can easily carry out the present invention. As those skilled in the art would realize, the described embodiments may be modified in various different ways, all without departing from the spirit or scope of the present invention.

Constituent elements having the same structures throughout the embodiments are denoted by the same reference numerals and are described in a first exemplary embodiment. In the other exemplary embodiments; only constituent elements other than the same constituent elements are described.

To clearly describe the exemplary embodiments of the present invention, parts not related to the description are omitted, and like reference numerals designate like constituent elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a block diagram of an X-ray detecting apparatus constructed as an exemplary embodiment according to the principles of the present invention.

Referring to FIG. 1, an X-ray detecting apparatus includes a signal controller 100, a scan driver 200, a reset driver 300, a data detector 400, and an X-ray receiving panel 500.

X-ray receiving panel 500 includes a plurality of scan lines S1-Sn, a plurality of reset lines R1-Rn, a plurality of data lines D1-Dm, and a plurality of photo-detecting pixels PX. The plurality of photo-detecting pixels PX are connected to the plurality of signal lines S1-Sn, R1-Rn, and D1-Dm and are arranged in an approximate matrix form.

Scan lines S1-Sn extend in an approximate row direction and are almost parallel to each other. Reset lines R1-Rn respectively correspond to scan lines S1-Sn and extend in an approximate row direction. Data lines D1-Dm extend in an approximate column direction and are almost parallel to each other. Data lines D1-Dm are respectively connected to data capacitors C1-Cm to maintain a voltage of a data signal output from each photo-detecting pixel PX. X-ray receiving panel 500 is supplied with a bias voltage Vbias to respectively operate the plurality Of photo-detecting pixels PX.

A scintillator layer (not shown) to convert X-rays into visible rays is provided in the surface of X-ray receiving panel 500 to which the X-rays are incident. A scintillator is material which exhibits scintillation, which is a property of luminescence when excited by ionizing radiation. The scintillator layer may be made of gadolinium oxysulfide (GOS).

Signal controller 100 generates a scan driving signal CONT1 and a reset driving signal CONT2 corresponding to a signal supplied from an external device. Scan driving signal CONT1 is a signal controlling the operation of scan driver 200, and reset driving signal CONT2 is a signal controlling the operation of reset driver 300. Signal controller 100 provides the generated scan driving signal CONT1 to scan driver 200 and the generated reset driving signal CONT2 to reset driver 300.

Scan driver 200 is connected to scan lines S1-Sn of X-ray receiving panel 500. Scan driver 200 generates a plurality of scan signals consisting of a combination of a gate-on voltage Von_g for turning on a switching transistor (M1 of FIG. 2) and a gate-Off voltage Voff_g for turning off switching transistor M1, and respectively apply the combination of gate-on voltage Von_g and gate-off voltage Voff_g to the plurality of scan lines S1-Sn according to scan driving signal CONT1. During one frame period, scan lines S1-Sn are scanned by receiving the plurality of scan signals for at least one time.

Reset driver 300 is connected to reset lines R1-Rn of X-ray receiving panel 500, and applies a plurality of reset signals consisting of a reset-on voltage Von_r for turning on a reset transistor (M3 of FIG. 2) and a reset-off voltage Voff_r for turning off reset transistor M3 to the plurality of reset lines R1-Rn according to reset driving signal CONT2.

Reset driver 300 resets a rheobase voltage generated by the plurality of photo-detecting pixels PX for noise sampling. A rheobase voltage is the minimal electric voltage necessary to produce a response or that is able to cause an excitation. Reset driver 300 applies reset-on voltage Von_r to reset lines R1-Rn until a corresponding frame is finished after the noise sampling. The detailed driving method will be described later.

Data detector 400 is connected to data lines D1-Dm of X-ray receiving panel 500, and receives and reads out an analog data signal output from X-rays receiving panel 500 to generate a digital data signal. Data detector 400 may detect a first data signal generated according to the X-rays input to photo-detecting pixel PX and a compensation data signal from which the noise is removed by using a second data signal received through the noise sampling. Data detector 400 may include a readout integrated circuit (ROTC) reading out the electrical digital data signal.

The above-described driving devices 100, 200, 300, and 400 may be directly mounted on X-ray receiving panel 500 or a flexible printed circuit film (not shown) that is attached to X-ray receiving panel 500 in the form of an integrated circuit chip, or may be attached to X-ray receiving panel 500 or integrated in first insulation substrate 110 or a separated printed circuit board (not shown) in the form of a tape carrier package (TCP). Alternatively, driving devices 100, 200, 300, and 400 may be integrated in X-ray receiving panel 500 along with signal lines S1-Sn, R1-Rn, and D1-Dm.

Figure 2:
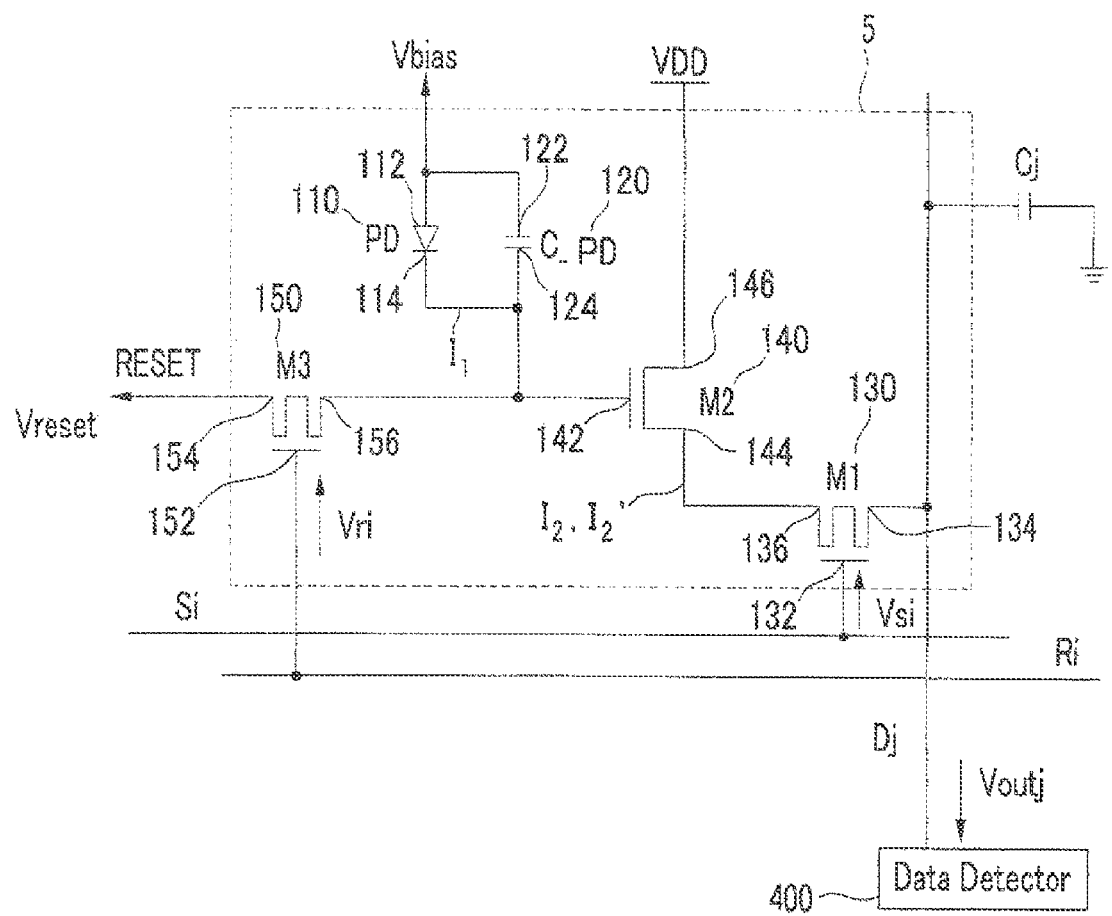
FIG. 2 is a circuit diagram of one photo-detecting pixel of FIG. 1 constructed as an exemplary embodiment according to the principles of the present invention.

FIG. 2 is a circuit diagram of one photo-detecting pixel of FIG. 1 constructed as an embodiment according to the principles of the present invention.

Referring to FIG. 2, one photo-detecting pixel 5 of the X-ray detecting apparatus includes a photodiode PD 110, a photodiode capacitor C_PD 120, a switching transistor M1 130, a driving transistor M2 140, and a reset transistor M3 150.

Photodiode PD 110 includes an anode 112 supplied with bias voltage Vbias and a cathode 114 connected to a gate 142 of driving transistor M2 140.

Photodiode capacitor C_PD 120 includes a first terminal 122 connected to cathode 114 of photodiode PD 110 and a second terminal 124 connected to anode 112 of photodiode PD 110. Photodiode PD 110 generates an electrical current $I_1$ corresponding to visible rays generated by the scintillator layer when X-rays incident on the scintillator layer, and the generated electrical current $I_1$ is charged to photodiode capacitor C_PD 120. The voltage charged in photodiode capacitor C_PD 120 is referred to as the rheobase voltage. That is, the electrical potential difference across photodiode capacitor C_PD 120 is referred to as the rheobase voltage. As photodiode PD 110, a hydrogenated amorphous silicon (a-Si: H) PIN diode may be used.

Switching transistor M1 130 includes a gate electrode 132 connected to scan line Si, a first electrode 134 connected data line Dj, and a second electrode 136 connected to a first electrode 144 of driving transistor M2 140.

Switching transistor M1 130 switches current $I_2$ flowing through driving transistor M2 140. Switching transistor M1 130 is turned on if scan signal Vsi of gate-on voltage Von_g is applied from scan line Si, and data capacitor Cj connected to data line Dj is charged by current $I_2$ flowing through driving transistor M2 140. As a result, data capacitor Cj is charged with a data voltage. The data voltage charged to data capacitor Cj is provided to data detector 400 through data line Dj. As switching transistor M1 130, a low temperature poly-Si (LTPS) TFT may be used. LTPS TFT has a low turning-on resistance compared with a-Si TFT, and thus having a small time to be turned on. As a result, the LTPS TFT may obtain a time margin sufficient for high speed operation.

Driving transistor M2 140 includes a gate electrode 142 connected to second terminal 124 of photodiode capacitor C_PD 120, a first electrode 144 connected to second electrode 136 of switching transistor M1 130, and a second electrode 146 connected to a voltage source VDD. Gate electrode 142 of driving transistor M2 140 is transmitted with the rheobase voltage stored in photodiode capacitor C_PD 120 such that current $I_2$ corresponding to the rheobase voltage flows into driving transistor M2 140.

Reset transistor M3 150 includes a gate electrode 152 connected to reset line Ri, a first electrode 154 connected to reset voltage Vreset, and a second electrode 156 connected to second terminal 124 of photodiode capacitor C_PD 120. Reset transistor M3 150 is turned on if reset signal Vri is applied from reset line Ri and resets the rheobase voltage charged in photodiode capacitor C_PD 120 to reset voltage Vreset. As reset transistor M3 150, the low temperature poly-silicon TFT may be used.

Figure 3:
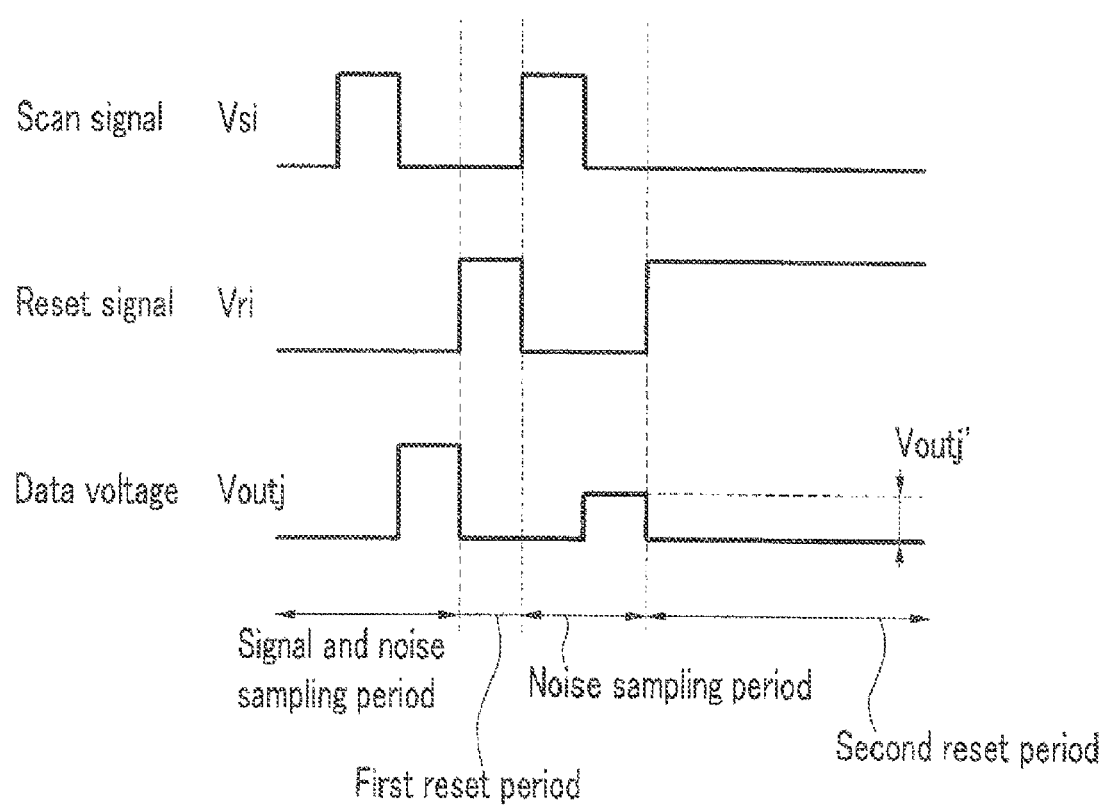
FIG. 3 is a timing diagram of the signals for driving the X-ray detecting apparatus of FIG. 1 as an exemplary embodiment according to the principles of the present invention.

Next, a driving method of an X-ray detecting apparatus according to an exemplary embodiment of the present invention will be described with reference to FIGS. 1 to 3. FIG. 3 is a timing diagram for explaining the X-ray detecting apparatus shown in FIG. 1. FIG. 3 shows a waveform of signals applied to a pixel PX disposed at an arbitrary i-th row and j-th column.

Referring to FIGS. 1 to 3, X-rays emitted from the X-ray generator (not shown) pass through a subject and are incident to the X-ray detecting apparatus. In the X-ray detecting apparatus, the X-rays pass through the scintillator layer and are converted into visible rays, and the converted visible rays are incident to photodiode PD 110 of photo-detecting pixel PX 5 of the X-ray detecting apparatus. Photodiode PD 110 generates an electrical current $I_1$ corresponding to the incident visible rays, and the generated electrical current $I_1$ charges photodiode capacitor C_PD 120. For example, photodiode PD 110 may generate a large current corresponding to strong visible rays, and photodiode capacitor C_PD 120 is charged with a high rheobase voltage according to the generated current amount.

Signal controller 100 generates scan driving signal CONT1 and reset driving signal CONT2 to be suitable for the operation of scan driver 200 and reset driver 300 according to a signal input from an external device. Scan driving signal CONT1 is output to scan driver 200, and reset driving signal CONT2 is output to reset driver 300. For example, when the emission of the X-rays is started from the X-ray generator, an X-ray emission start signal is transmitted to signal controller 100, and signal controller 100 may generate scan driving signal CONT1 and reset driving signal CONT2 if the X-ray emission start signal is input.

Scan driver 200 may sequentially apply scan signal Vs to the plurality of scan lines S1-Sn according to scan driving signal CONT1. Reset driver 300 may apply reset signal Vr to the plurality of reset lines R1-Rn corresponding to scan signal Vs according to reset driving signal CONT2.

Hereinafter, the operation of photo-detecting pixel PX of the arbitrary i-th row and j-th column according to the applied signals will be described with reference to FIG. 2 and FIG. 3. The other pixels PX of X-ray receiving panel 500 are operated with the same method.

In a signal and noise sampling period T1, scan driver 200 applies gate-on voltage Von_gi to scan line Si to turn on switching transistor M1 130. The rheobase voltage charged to photodiode capacitor C_PD 120 turns on driving transistor M2 140. Current $I_2$ corresponding to the rheobase voltage charged to photodiode capacitor C_PD 120 flows through driving transistor M2 140, passes through the turned-on switching transistor M1 130 and flows into data capacitor Cj. Data capacitor Cj is charged with first data voltage Voutj corresponding to the amount of current $I_2$. Here, first data voltage Voutj is the voltage charged to data capacitor Cj by current $I_2$. Current $I_2$ corresponds to the rheobase voltage and bias voltage Vbias connected to anode 112 of photodiode PD 110. The rheobase voltage is charged to photodiode capacitor 120 by current $I_1$ generated in photodiode PD 110.

First data voltage Voutj charged to data capacitor Cj is applied to data detector 400 through data line Dj. Data detector 400 samples first data voltage Voutj output from photo-detecting pixel PX. The sampling of first data voltage Voutj is referred to as signal and noise sampling.

In first reset period T2, reset driver 300 applies reset-on voltage Von_ri to reset line Ri to turn on reset transistor M3 150, and scan driver 200 applies gate-off voltage Voff_gi to scan line Si to turn off switching transistor M1 130. When reset transistor M3 150 is turned on, the rheobase voltage charged to photodiode capacitor C_PD 120 is reset to reset voltage Vreset. Reset voltage Vreset and bias voltage Vbias may be the same voltage, or may be different predetermined voltages.

In noise sampling period T3, scan driver 200 applies gate-on voltage Von_gi to scan line Si to again turn on switching transistor M1 130, and reset driver 300 applies gate-off voltage Voff_ri to reset line Ri to turn of reset transistor M3 150. When switching transistor M1 130 is turned on, current $I_2'$ flows through driving transistor M2 140 and the turned on switching transistor M1 130, and flows into data capacitor Cj. Data capacitor Cj is charged to second data voltage Voutj' corresponding to the amount of current through driving transistor M2. Here, second data voltage Voutj' is the data voltage corresponding to bias voltage Vbias. Second data voltage Voutj' charged to data capacitor C_j is applied to data detector 400 through data line Dj. Data detector 400 samples second data voltage Voutj' output from photo-detecting pixel PX. The sampling of second data voltage Voutj' is referred to as noise sampling.

Data detector 400 may obtain a difference between first data voltage Voutj obtained through the signal and noise sampling and second data voltage Voutj' obtained through the noise sampling. Accordingly, data detector 400 removes the electrical noise generated by the bias voltage Vbias thereby detecting a compensation data signal (e.g., Voutj-Voutj') corresponding to the current only generated in photodiode PD 110. Data detector 400 outputs the detected compensation data signal to the display apparatus (not shown), thereby displaying the X-ray image.

After noise sampling period T3, in second reset period T4, reset driver 300 applies reset-on voltage Von_ri to reset lines Ri to again turn on reset transistor M3 150, and scan driver 200 applies gate-off voltage Voff_gi to scan line Si to turn off switching transistor M1 130. Second reset period T4 is the period from the time that the signal and noise sampling and the noise sampling are finished until the time that the corresponding frame is finished. That is, reset driver 300 applies reset-on voltage Von_ri to reset line Ri until the time that one frame is finished, and photodiode capacitor C_PD 120 maintains the reset state as reset voltage Vreset until the time that one frame is finished. That is, the rheobase voltage by current $I_1$ generated in photodiode PD is reset until the receiving of the next image after obtaining the image. Accordingly, the reset period may be sufficiently obtained, and the image delay due to the image of the previous frame is reset before the next frame such that the image delay of the next frame may be minimized. The X-rays are irradiated during the signal and noise sampling period T1, and the noise sampling period T3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for driving an X-ray detecting apparatus, comprising:
    sampling a first data voltage corresponding to a rheobase voltage and a bias voltage, said rheobase voltage being generated by a current from a photodiode;
    sampling a second data voltage corresponding to the bias voltage after resetting the rheobase voltage; and
    resetting the rheobase voltage from the time that the sampling of the second data voltage is finished to the time that a corresponding frame is finished.

2. The method of claim 1, wherein the sampling of the first data voltage comprises:
    applying a scan signal to turn on a switching transistor, the switching transistor switching a current corresponding to the rheobase voltage to generate the first data voltage; and
    applying the first data voltage to a data detector through the turned-on switching transistor.

3. The method of claim 2, wherein the sampling of the second data voltage comprises:
    applying a reset signal to a reset transistor resetting the rheobase voltage;
    applying the scan signal to turn on the switching transistor and to generate the second data voltage; and
    applying the second data voltage to the data detector through the turned-on switching transistor.

4. The method of claim 1, further comprising removing electrical noise by obtaining a difference between the first data voltage and the second data voltage.

5. An X-ray detecting apparatus, comprising:
    an X-ray receiving panel including a photo-detecting pixel;
    a data detector detecting a data signal from which noise is removed from a signal output from the X-ray receiving panel through noise sampling; and
    a reset driver applying a reset signal to the photo-detecting pixel, said reset signal resetting a rheobase voltage generated by the photo-detecting pixel for the noise sampling,
    the reset driver applying the reset signal after detecting the data signal from which the noise is removed in the data detector until the time that a corresponding frame is finished.

6. The X-ray detecting apparatus of claim 5, wherein the photo-detecting pixel includes:
    a photodiode generating a first current corresponding to visible rays incident through a scintillator layer;
    a capacitor being charged by the first current generated in the photodiode;
    a driving transistor passing a second current corresponding to a voltage charged to the capacitor;
    a switching transistor switching the second current flowing in through the driving transistor; and
    a reset transistor resetting the voltage charged to the capacitor.

7. The X-ray detecting apparatus of claim 6, wherein the photodiode is a hydrogenated amorphous silicon PIN diode.

8. The X-ray detecting apparatus of claim 6, wherein the switching transistor is a low temperature polysilicon thin film transistor (TFT).

9. The X-ray detecting apparatus of claim 6, wherein the reset transistor is a low temperature polysilicon TFT.

10. The X-ray detecting apparatus of claim 6, further comprising a scan driver applying a scan signal to a scan line connected to a gate electrode of the switching transistor, said scan signal turning on or turning off the switching transistor.

11. The X-ray detecting apparatus of claim 10, further comprising a signal controller generating a reset driving signal controlling the operation of the reset driver and generating a scan driving signal controlling the operation of the scan driver.

* * * * *